United States Patent
Parikh et al.

(10) Patent No.: US 7,260,567 B2
(45) Date of Patent: Aug. 21, 2007

(54) NAVIGATION IN A HIERARCHICAL STRUCTURED TRANSACTION PROCESSING SYSTEM

(75) Inventors: Prashant Parikh, New York, NY (US); Stanley Peters, Menlo Park, CA (US)

(73) Assignee: Noema, Inc., New York, NY (US)

( * ) Notice: Subject to any disclaimer, the term of this patent is extended or adjusted under 35 U.S.C. 154(b) by 602 days.

(21) Appl. No.: 10/799,429

(22) Filed: Mar. 11, 2004

(65) Prior Publication Data
US 2004/0181392 A1    Sep. 16, 2004

Related U.S. Application Data

(62) Division of application No. 10/299,359, filed on Nov. 19, 2002, now Pat. No. 7,231,379.

(51) Int. Cl.
*G06F 17/30* (2006.01)
(52) U.S. Cl. .................. 707/3; 707/2; 707/6; 707/4
(58) Field of Classification Search ............. 707/1–10, 707/100–104.1, 200–206; 704/9; 715/744
See application file for complete search history.

(56) References Cited

U.S. PATENT DOCUMENTS 6,405,188 B1    6/2002   Schwartz et al.
6,510,406 B1 *  1/2003   Marchisio ................... 704/9
6,675,159 B1    1/2004   Lin et al.
6,859,212 B2 *  2/2005   Kumar et al. ............ 715/744

OTHER PUBLICATIONS

International Search Report for PCT/US03/34134, dated Apr. 8, 2004 (1 page).

* cited by examiner

*Primary Examiner*—Yicun Wu
(74) *Attorney, Agent, or Firm*—Morgan & Finnegan LLP

(57) ABSTRACT

A method performed in a system having multiple navigable nodes interconnected in a hierarchical arrangement involves receiving an input containing at least one word identifiable with at least one keyword, identifying at least one node, other than the first node, not directly connected to the first node, but associated with the at least one keyword, and jumping to the identified node. A transaction processing system having a hierarchical arrangement of nodes and is configured for user navigation among the nodes. The system has an inverted index correlating keywords with at least some nodes in the arrangement so that when the user provides an input in response to a verbal description and the response includes a meaningful word correlatable with a keyword, the system will identify at least one node correlated to the meaningful word by the inverted index and jump to that node without first traversing any other node.

6 Claims, 11 Drawing Sheets

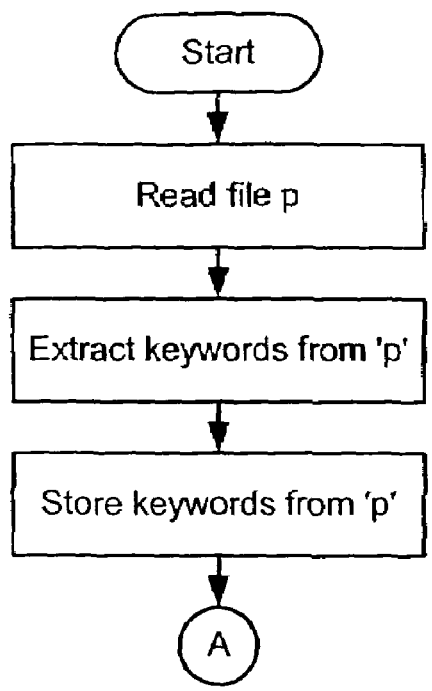
FIG. 7A
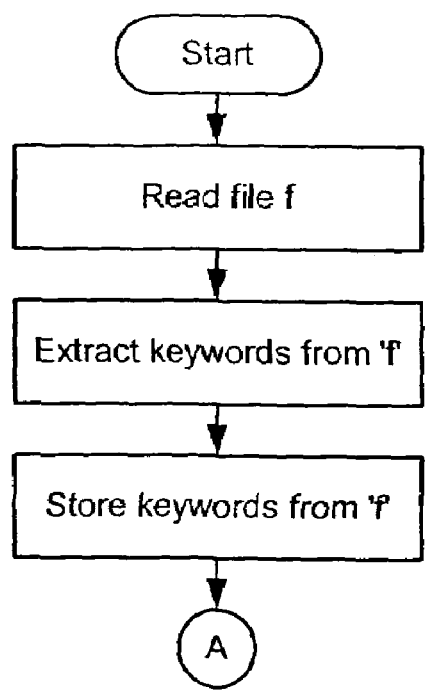
FIG. 7B
FIG. 8
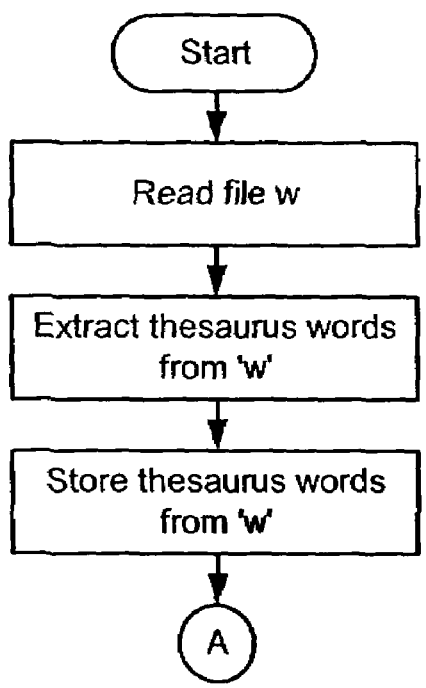

NAVIGATION IN A HIERARCHICAL STRUCTURED TRANSACTION PROCESSING SYSTEM

CROSS REFERENCE TO RELATED APPLICATION(S)

This application is a divisional of U.S. patent application Ser. No. 10/299,359 filed Nov. 19, 2002 now U.S. Pat. No. 7,231,379.

NOTICE OF COPYRIGHT RIGHTS

A portion of the disclosure of this patent document, particularly the Appendix, contains material that is protected by copyright. The copyright owner has no objection to the facsimile reproduction of the patent document or the patent disclosure as it appears in the Patent and Trademark Office file or records, but otherwise reserves all copyright rights whatsoever.

FIELD OF THE INVENTION

The present invention relates to information processing and, more particularly, computer based transaction processing.

BACKGROUND OF THE INVENTION

In everyday life, networks of choices set forth in a particular order or hierarchy are encountered with increasing frequency. Usually, it is desired to traverse the network in the most efficient manner possible to accomplish a particular goal.

In modern mathematics, graph theory is used to study networks of hierarchical choices. The hierarchical networks can be represented as a graph structure. Graph theory finds practical applications in chemistry, computer science, economics, electronics and linguistics.

A graph structure is a collection of points, called "vertices", and a collection of lines, called "edges". Each edge joins a pair of vertices or a single point to itself.

A simple example of a network represented by a graph structure is a road map. The vertices represent towns or cities. The edges represent the roads that connect the towns and cities.

Another type of network familiar to anyone who has a telephone is an automated telephone voice response system, such as commonly utilized by many large companies, to direct incoming calls to particular individuals or departments or to assist the caller in performing a transaction, such as making a purchase.

That type of telephone network can also be represented as a graph structure. When the system answers an incoming call, it transmits a verbal description or prompt to the caller: "If you would like to speak to Harry, press 1; if you would like to speak to Fred, press 2". (In general, we will use "verbal description" to mean a set of words relating to the subject matter whether presented audibly or in written form. The verbal descriptions may range from a few words to an entire document worth of text). A first vertex on the graph represents the initial prompt, which a caller hears upon reaching the telephone response system. If the user's response is pressing 1, calls are directed along a first edge to Harry, represented by a second vertex. If the response is pressing 2, the call is directed along a second edge to Fred, represented by a third vertex. Then, if the chosen person is not available, the caller is asked whether the caller wishes to leave a message. If the response is positive, the caller is directed along another edge to the selected person's voice mail, which would be represented by another vertex of the graph.

In general, whether for a telephone response network or for any other application representable by a graph structure, the caller or user of the system will have some goal. By "goal" we mean a combination of transactions and information accesses which the user seeks to accomplish. By "transaction" we mean an operation performed electronically with a user. In general, there will also be a combination of vertices or nodes in the graph that best represent or are closest to the goal the user is trying to accomplish. We call these vertices the "goal vertices".

For the user, the object in navigating the graph is to get from the first vertex to the goal vertices. If this is not done as quickly and efficiently as possible the user may become frustrated and give up. Moreover, as the number of possible choices or nodes in the network becomes larger, the number of possible pathways between the first vertex and the goal vertices multiplies rapidly. Therefore, the ability to reach the goal vertex can become more difficult, require navigation of an excessive number of choices or nodes, or discourage a user before the goal vertex is even reached.

SUMMARY OF THE INVENTION

The present invention creates a method for navigating efficiently and naturally through a series of choices to obtain information, perform transactions, or accomplish some similar goal. The invention is implemented in a programmed computer that has a hierarchically configured decisional network that must be navigated as part of the processing and is constructed to accept inputs or data and process them in a manner that facilitates navigation of the network vertices more efficiently.

BRIEF DESCRIPTION OF THE DRAWINGS

FIGS. 7A, 7B, and 8-10 are collectively a flowchart illustrating an example setup process for use in accordance with an example implementation of one variant of the present invention.

DETAILED DESCRIPTION

Figure 1:
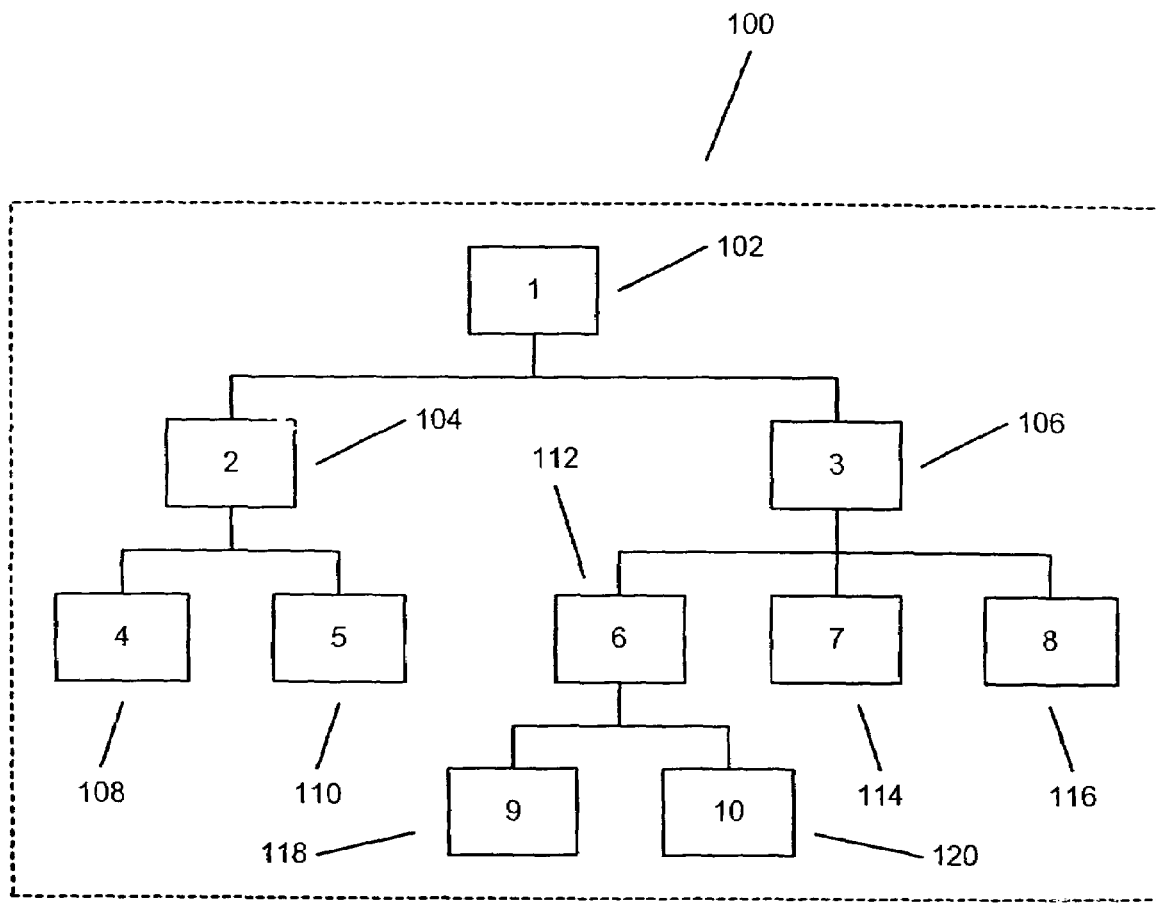
FIG. 1 is an example graph representing a simple, generic hierarchically arranged transaction processing or decisional system suitable for use with the invention.

In graph theory, mathematicians refer to a "path" from one vertex in a graph to another specified vertex in the graph as consisting of a sequence of edges that connect the vertices between the first vertex and the final vertex. If the path contains an edge sequence that is "closed", meaning that it loops back on itself, the path is called a "circuit" or a "cycle". A graph structure is considered to be "connected" if there is at least one path connecting every pair of vertices.

Our invention is particularly applicable to transactional processing as applied to instances where graph theory can be used to represent the transactions as a set of options and when the options are structured according to a connected graph that contains no circuits. We call such a graph a "tree". We use the term "menu tree" for a network that provides a "menu" of options, typically presented as verbal descriptions, to assist a user in making a series of choices through which he or she is able to accomplish one or more of his or her information access or transaction goals. Informally, a "menu tree" can be regarded as a series of vertices in a hierarchy or ordered pattern, arranged in rows of increasing numbers of vertices. More precisely, a "menu tree" can be represented as a "tree" in which (i) the vertices are all the options provided anywhere in the "menu tree", plus a first vertex, (ii) every vertex except the first vertex, i.e., every "option vertex", is associated with the verbal description (or such other means) by which a "menu" presents that option, (iii) an edge connects the first vertex to each vertex that the first "menu" presents to the user as an option, and (iv) each other vertex is similarly connected by edges to every other vertex that the corresponding "menu" presents to the user as an option. As the number of options increases, so does the length of paths from the first vertex to goal vertices.

In overview, in accordance with the teachings of our invention, the user can navigate the graph or tree in a way that allows them to skip from one vertex to another vertex that may be many rows down the graph or tree and/or where the vertices may not be connected together by an edge. This eliminates the necessity for making many choices.

Particular implementations make it possible to jump laterally from one vertex to another if the navigation enters a wrong branch of the tree or if the user changes his goal. The approach is accomplished through associating each vertex with a verbal description (or prompt), and matching words in users' requests and responses with these verbal descriptions to enable the selection of vertices that may not be directly connected to the user's current location in the graph or tree by an edge.

In some variants, we create a system with the unique ability to learn by incorporating previously unknown words, keyword or synonyms of keywords so that the system modifies itself to thereby increase the likelihood that a user will efficiently and quickly reach the goal.

For purposes of illustration, the invention will be described by way of example, first using a series of simple examples followed by a more complex example of a more detailed and commercially suitable example variant, in the context of a menu-type automated telephone voice response system for a publication, a hierarchical network of the type that is frequently encountered and easily understood that implements a combination of some of the features of the simple examples in order to illustrate how those features can be combined or overlayed.

It should be understood that the present invention is applicable to a wide range of different networks, which can be mathematically represented by graph structures consisting of vertices and edges and should not be considered to be limited to the particular application described. Representative examples of suitable applications for the invention include implementing an enhanced and more efficient "Find" function or file system browser for personal computer operating systems, a navigation system for television program listing, document management or retrieval systems, a "geographic information system" in an automobile that allows location of addresses or business(es) meeting certain criteria, or other devices that incorporate some hierarchical navigation aspect as part of its operation.

In order to more fully understand the invention, various independent aspects are now presented below by way of simple illustrative examples. In this manner the teachings of the invention can be understood in a way that makes it possible to use, overlay and/or combine those aspects in a beneficial manner in an implementation of the invention. Depending upon the particular implementation of the invention, one or more of the aspects may be used together in various permutations and/or combinations, with the understanding that different permutations and/or combinations may be better suited for particular applications or have more or less benefits or advantages than others.

The underlying scenario common to all these basic examples is that there is a hierarchical arrangement to the possible choices that can be illustrated in a form of "tree" structure.

FIG. 1 is an example graph 100 representing a possible hierarchically arranged transaction processing or decisional system suitable for use with the invention. The individual boxes 102-120 are referred to as "nodes" and each represents a specific choice or option in the hierarchy. For purposes described in more detail below, each node is arbitrarily uniquely identified in some manner. In the example of FIG. 1, the individual nodes 102-120 are numbered 1 through 10 starting from the top node 102 in the hierarchy.

Each "node" is associated with exactly one verbal description, for example in the case of an airline system, a verbal description relating to some aspect of the reservation process. Each such description contains "key" words that are deemed to be of importance and other words that can be disregarded. For example, one node may have the associated verbal description "Would you like to make a reservation?" In this description, there is only one "key" word—"reservation" deemed important, so all of the other words in the description can be ignored.

A level in the hierarchy below that one may be used to obtain further narrowing information, for example, using the verbal description "Is the reservation for a domestic or international flight?" In this description, the terms "domestic" and "international" are "key" words. Similarly, the word "flight" could be a "key" word, for example, for a system that involves not only airline travel but also rail and/or cruise travel or it could be an "ignored" or stop word for a purely airline related system because it has minimal meaning in that context. Again, the other words can be ignored as well.

The unique identification of each node allows the creation of a list of all the key words and their associated nodes so that, if a key word is duplicated in two or more nodes, it need only be listed once. For example, a hierarchical tree related to "pens" might have nodes for ball-point pens, fine point pens, medium point pens, fountain pens, felt-tip pens, quill pens, erasable pens, etc. By using this approach, one could list the keyword "point" once, but associate it with each of the nodes where that keyword appears by using the unique identifier for each node where the term appears.

In this manner the keywords are obtained from the collection of available descriptions found in the particular application in which the invention will be used. In addition, each particular node where the keyword appears is associated with the keyword. Thus, with respect to the pen application above, the keyword "point" might appear in nodes 2, 3, 6, 7, 13 and 15. Similarly, the keyword "erasable" might appear in nodes 3, 4, 5, 6 and 22. An index, as described more fully below, associating these keywords with the nodes containing them is then created, for example:

point: 2, 3, 6, 7, 13,15
erasable: 3, 4, 5, 22

By making use of these associations the "tree" can be negotiated by allowing presentation of relevant verbal descriptions for the nodes associated with a term, irrespective of where in the hierarchy they are, thereby causing a "jump" to a particular node without necessarily traversing the tree in the rigid hierarchical manner.

Various examples will now be presented to illustrate certain concepts related to the invention. It should be understood that while these examples are presented in the context of things and likely experiences of ordinary people, the same approach can be applied to other forms of transaction processing including navigating through hierarchically nested data files in a computer system, pattern analysis or image processing, etc. the term "transaction" as used herein relating to traversal through a hierarchy to a goal, not mathematical calculation per se.

Moreover, the specific formats used and presented in these examples are purely for illustration purposes. It should be understood that that other techniques for interrelating data, such as hash tables, direct or indirect indexing, etc. can be substituted in a straightforward manner. Thus, for example, the relationship between the word and a node could be configured such that the location of the word in a list as the "n-th" item could be used as an index into another list containing the nodes correlated to the list. A similar approach could be used for the thesaurus, the important aspect relative to the invention being the relationship among certain words and the node(s) in which they occur and, where applicable, the relationship between certain words and "synonyms" for those words, not the data structure or its form or format whereby that information is kept or maintained.

EXAMPLE 1

Figure 2:
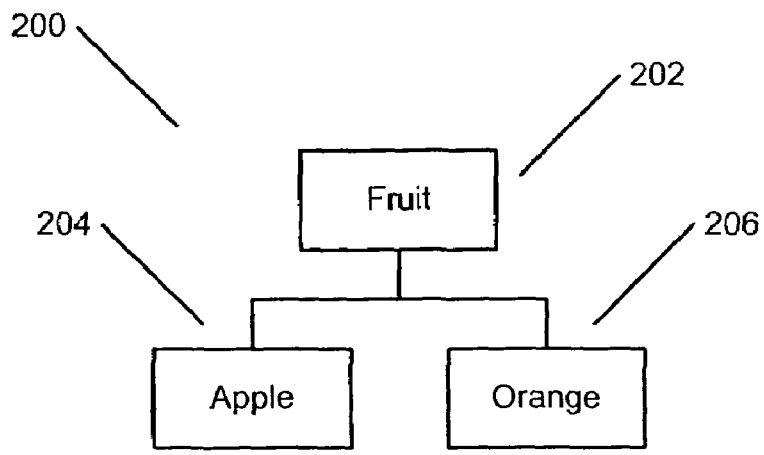
FIG. 2 is an example portion of a graph used to illustrate jumping among nodes in accordance with one variant of the invention.

Example 1 illustrates, in simplified form, how an index is used to jump among nodes with reference to FIG. 2. In this example, the hierarchical tree 200 represents a portion of a more complex tree specifically involving possible decision relating to fruit and a decision between two specific types of fruits, an apple and an orange.

In prior art hierarchical trees, navigation of this graph 200 would necessarily involve going through the "fruit" node 202 in order to reach the "apple" 204 or "orange" 206 nodes. As a result, assuming this simple tree was part of a larger tree for an on-line supermarket that prompted the user for what they wanted to purchase, the exchange would be both rigid and time consuming. For example, in response to a prompt "What do you want to purchase?" if the response was anything other than "fruit" traversal to the "fruit" node 202 could not occur. At the point in the tree that would lead to the "fruit" node 202, neither apple nor orange would be an acceptable response.

In accordance with the invention, assuming the only relevant keywords for that portion of the tree were "fruit", "apple" and "orange", an inverted index would be created that includes an association of "Fruit" with the top node 202, "Apple" with the bottom left node 204, and "Orange" with the bottom right node 206. As shown above, that association can be created using node identifiers, in this example, the node identifiers 1A01, 1A02 and 1A03 are arbitrarily assigned and used. Thus, the information can be stored in a file, for example, as follows:

Fruit, 1A01
Apple, 1A02
Orange, 1A03

Accordingly, to navigate the system 200, when a response to a verbal description is provided by a user, possible keywords are identified in the response and used to search the index and identify any node to which the response may be directed, irrespective of the hierarchy. Thus, a user response of "an orange" to a verbal description located above the "fruit" node 202 in the hierarchy, for example, "What would you like to buy today?" would cause the system to identify "orange" as a key word from the response, search the index, and directly identify node 1A03 (206) as the node whose verbal description should be presented next, thereby avoiding the need to traverse intervening nodes, for example, through the "fruit" node (202) 1A01, at all. This illustrates an example of a simple jump according to the invention.

EXAMPLE 2

Having illustrated a simple "node jump" a more complex (and likely) scenario can be shown. In this example, the Example 1 graph of FIG. 2 applies, but relevant portion of the index is as follows:

Fruit, 1A01
Apple, 1A02, 2F09
Orange, 1A03

As a result, there are two nodes relevant to the keyword "apple" one being the node 204 in the portion of the graph shown in FIG. 2 and one in the node uniquely identified as 2F09 located somewhere else in the hierarchy (not shown).

In this example, a user response containing the keyword "apple" would identify nodes with identifiers 1A02 and 2F09. In this case, and unlike the prior art, the verbal descriptions from both nodes would be presented to the user, likely in alternative fashion. Thus, if the user did not want an apple, they wanted apple cider, node 2F09 might be more appropriate because it is part of the "drinks" portion of the overall hierarchy.

Thus, presenting the user with the verbal description from both nodes would likely result in a jump to the portion of the graph nearer to node 2F09 since it is closer to the user's goal thereby speeding up the process and avoiding potentially confusing or frustrating the user.

EXAMPLE 3

While the verbal descriptions associated with various nodes will generally be chosen to accurately represent the node, in accordance with certain variants of the invention, it is possible to create a situation where a user response takes them away from their ultimate desired goal. Nevertheless, by using the teachings of the present invention, the user can often still be brought to their goal quicker than possible with the prior art because the user need not rigidly trace through the hierarchy. This is accomplished by virtue of the "grouping" aspect inherent in some implementations of the invention.

Figure 3:
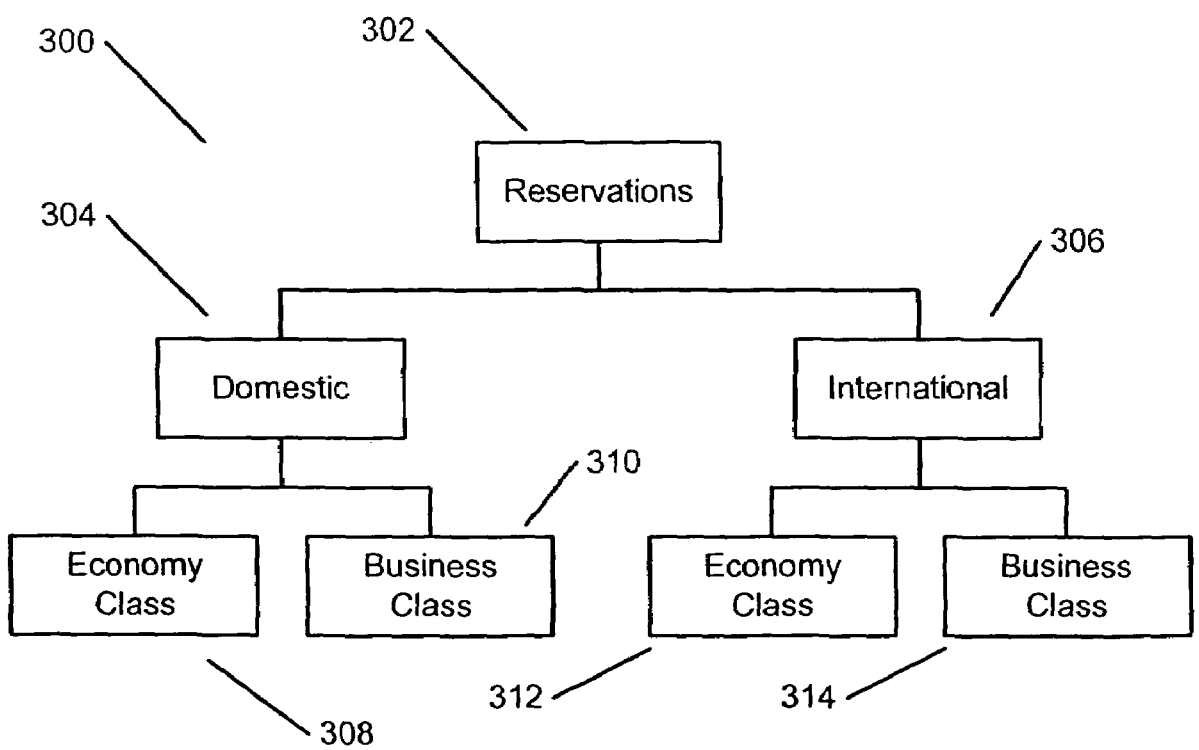
FIG. 3 is an example portion of a graph in a simple interactive voice response ("IVR") system used to illustrate grouping in accordance with one variant of the invention.

This example illustrates the "grouping" aspect using a simplified graph 300 representing a portion of an airline reservation system as shown in FIG. 3.

In particular, the graph of FIG. 3 can be thought of as part of a very simple interactive voice response ("IVR") system.

As described above, each node is uniquely identified, for example, by the numbers 1 through 7 and the identified terms "Reservation", "Domestic", "Intentional", "Business Class", "Economy Class" are deemed the relevant keywords. Note, there is no requirement for a the "keyword" to be a single word, in some implementations, keywords could be single words, phrases of two or more words, or even some other form of information like a specific data pattern.

Again, an inverted index is created as described above associating those keywords with the nodes, in this case:

Reservation, 1
Domestic, 2
International, 3
Business Class, 4, 6
Economy Class, 5, 7

Assuming that the top node is assigned the number 1, its two child nodes (Domestic and International) are assigned the numbers 2 and 3, and the grandchild nodes (i.e. at the lowest level in the hierarchy) have been assigned numbers 4, 5, 6, and 7 taken from left to right each node can be uniquely located. Note that the last two entries in the inverted index are each associated with two nodes, 4 and 6 in the first case, and 5 and 7 in the second.

Using the above, the concept of grouping of nodes from different parts of the graph (i.e. nodes that are not siblings or nodes that do not have a common parent) can be explained.

Presume that the response to a verbal description presented as an initial query of "What do you want to do?" was "Make a business class reservation." In this case there are two keywords present, "reservation" and "business class".

Depending upon the particular implementation, as noted previously, the verbal descriptions associated with each identified node could be presented together or in sequence. Alternatively, and as is the case here, a set of rules can be established, for example, such that if an identified node is a sub-node of another identified node, only the verbal description of the sub-node(s) is provided because of inherent redundancy. Thus, since both "business class" nodes 310, 314 are sub-nodes of the "reservation" node 302, the verbal description associated with the "reservations" node can be suppressed if it can be determined that business class necessarily implies reservations.

In this example, a search of the inverted index would identify nodes 4 and 6 (310, 314) from different parts of the tree are associated with the keywords in the query, and thus the system, in presenting the verbal descriptions from each, in effect, alters the tree structure and groups these nodes in the result. Thus, the combination of result nodes presented depends upon the user query or response, not that predetermined by the graph structure itself.

Of course, the goal would still not be reached because of the ambiguity caused by "Business Class" being under both "Domestic" and "International". However, that ambiguity can be handled by suitable wording of the following verbal descriptions and whether they are combined or provided sequentially or by other nodes.

EXAMPLE 4

A persistent and further drawback present in the prior art is the inability to operate if any term other than the specific allowed terms are provided. Thus, in an IVR of the prior art, providing anything other than the recognized term(s) will likely result in meaningless repeat of the same inquiry by the IVR or an error.

Advantageously, the teachings of the present invention allow for construction of a more flexible system than available in the prior art. Specifically, we can incorporate a thesaurus to accommodate synonyms for the keywords.

Example 4 illustrates the addition of a simple thesaurus as an aspect of a system so that a synonym of a keyword may also be used by the system to jump to the desired nodes in the graph. Example 4 is discussed with reference to a portion 400 of an interactive television program listing system as shown in FIG. 4.

Such a system implementing the invention will allow a user to speak to or interact with a device to look for programs of his choice by time slot, genre, favorite actor or actress, etc.

Figure 4:
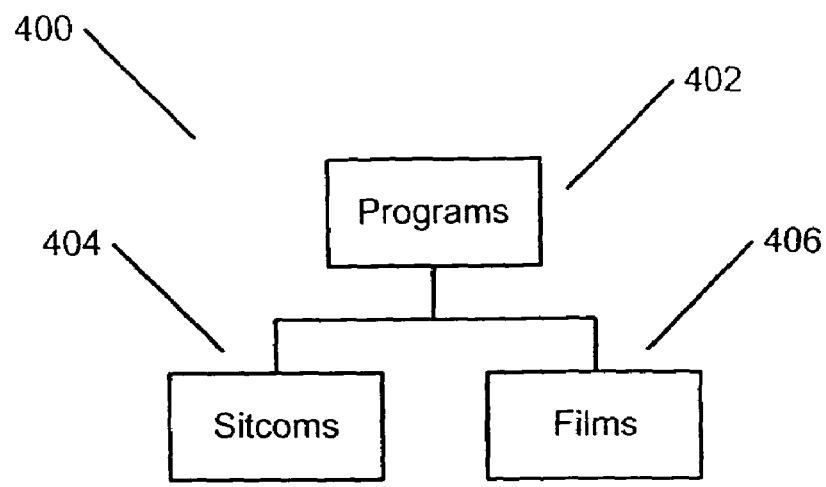
FIG. 4 is an example portion of a graph in a simple interactive television program listing used to illustrate another variant of the invention.

This example, as with the other examples above, use an inverted index, in this case one where each node 402, 404, 406 is uniquely identified by a string of six characters, the portion of which corresponding to FIG. 4 is shown as follows.

Programs; acgyct
Sitcoms; ifgnxh
Films; vnymos

Since a common synonym for "Films" is "Movies" a thesaurus can be created associating the two. Depending upon the particular implementation, thesaurus terms to be equated to the keywords can be taken from a standard thesaurus or can be custom created for the particular application. In addition, the equating of terms can be done in any of a myriad of different ways, the exact implementation details of which however re irrelevant to the invention, but a few representative examples of which however are contained herein for purposes of illustration.

In one example case, the equating can be done on a purely word basis. For example, a file can be constructed such that one or more single word synonyms are directly associated with an index word, for example as follows:

Movies, Flicks—Films

Alternatively, the synonyms can be equated with the node identifier(s) corresponding to the index term, for example as follows:

Movies, Flicks—vnymos

In the former case, the system would still have to search the index after the thesaurus has provided the proper index term(s). In the latter case, the thesaurus provides a direct link to the respective node(s) so that re-searching is not required.

In the system of Example 4, a user who provides the input "Movies" would cause the processing to occur as follows.

The system would search the inverted index of keywords and fail to locate "Movies" as a keyword. As a result, it would search the thesaurus and find that the word "Movies" is a synonym that can be correlated with a keyword. At this point, depending upon the particular thesaurus, it would either return to the inverted index and search using the synonym keyword "Films" and return the result as the node 406 identified by "vnymos", or go directly to the node 406 identified by "vnymos" based upon the thesaurus entry.

Of course, it is possible (and likely) that in actual usage a synonym will be associated with more than one keyword. For example, "Comedies" may be associated with both the keywords "Sitcoms" and "Films", resulting in, for example, the following entry in a thesaurus:

Comedies—Sitcoms, Films

In this case, a search for "Comedies" would result in the system identifying that the synonym was associated with nodes 404, 406 for both "Sitcoms" and "Films", and it would return both terms or node identifiers corresponding to the two keywords as the result.

EXAMPLE 5

Advantageously, the thesaurus concept can be extended further so that an initially unknown word (i.e. a word that is neither a keyword nor a thesaurus word) can be learned by the system and added to a thesaurus for future use.

This example is described with reference to FIG. 5 which is a portion 500 of a larger system graph as part of a very simple "geographic information system" found in some automobiles, kiosks and elsewhere today. Such a system enables a user to, among other things, identify and get information about different locations in an environment. For example, information about particular types of restaurants in an area.

In this example, the inverted index for the portion 500 shown in FIG. 5 could look as follows:

Restaurants, 1
Pizza, 2
Burgers, 3
Chinese, 4

A user issues the following query to the system "fast food" in order to find a quick meal.

The system's search of both the index and thesaurus would result in the "term", in this case a phrase, not being found in either. In this case, it is an unknown phrase, and the system has to learn the "meaning" of the term.

To do this, the system first offers the verbal description from the top level node(s) 502 to the user—in this example, just "Restaurants". The user presumably provides a positive response. (Of course, in a real system, it is possible and likely there are more top level nodes than just one. In that case, the user would be offered two or more of these nodes, and would have to select "Restaurants" to match his intended request.)

Continuing on, once the user has responded affirmatively, the system moves down the tree and offers the verbal description from each of the child nodes: "Pizza" (504), "Burgers" (506), and "Chinese" (508). Presuming that the user picks "Pizza", the transaction interaction would look something like this:

User: Fast food
System: Restaurants?
User: Yes
System: Pizza, Burgers, or Chinese?
User: Pizza At this point, the system has "learned" for the time being that it can equate "fast food" with "pizza" and can add "fast food" as a synonym to "pizza" in the thesaurus.

This user, who first used the unknown term "fast food", had to trace a path down the tree. However, now the system is able to associate "pizza" with "fast food" and create or add a thesaurus entry to reflect this association, for example as follows:

Fast food—Pizza

Thus, the system has learned a meaning of the initially unknown term "fast food" and has added it to the thesaurus for future use.

As a result, a subsequent uses of the same term "fast food" will enable the system to jump directly to the "pizza" node 504.

EXAMPLE 6

Figure 5:
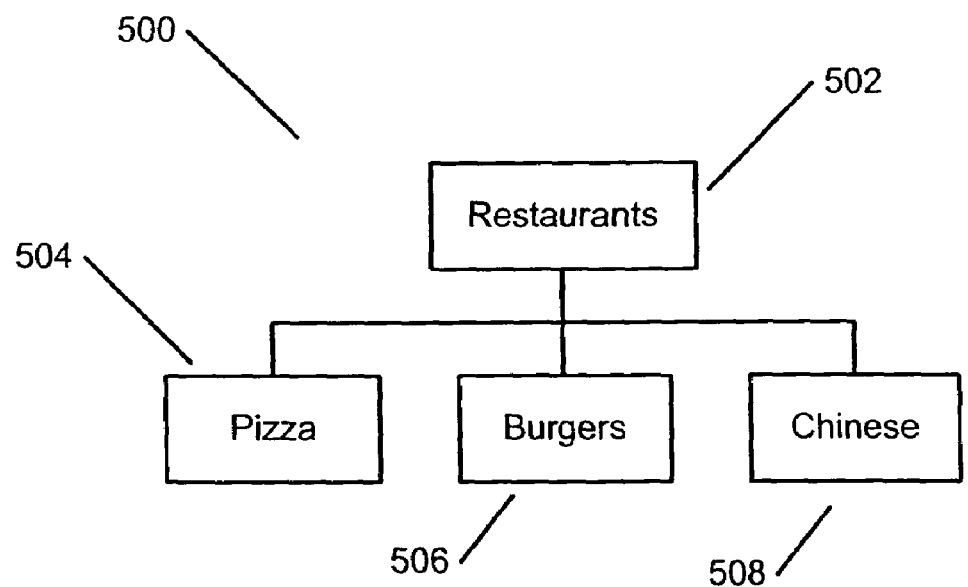
FIG. 5 is an example portion of a graph in a simple geographic information system used to illustrate a further variant of the invention.

This example illustrates how additional meanings for an existing thesaurus term or phrase can be learned by the system for future use, whether the existing thesaurus term or phrase was an original thesaurus term or one previously learned with continuing reference to FIG. 5.

At this point, the inverted index is unchanged as:
Restaurants, 1
Pizza, 2
Burgers, 3
Chinese, 4

Additionally, presume the following entry now exists in the thesaurus.

Fast food—Pizza

Suppose a new user now issues the query "fast food" as above, but with "Burgers" rather than "Pizza" in mind.

Based upon the thesaurus, the system would go directly to the "Pizza" node. However, the user will reject "Pizza", having "burgers" in mind. By rejecting the "Pizza" node 504 description, the user indicates that the "Pizza" node 504 is not of interest. The system is therefore configured with a further set of rules, in this case one in which the system goes up in the hierarchy to a higher node, the top node 502 in this portion of the example, and provides the verbal descriptions for the other nodes 502, 504, 506, 508 so as to cause a tracing down the tree. This can be illustrated by the following "dialog":

User: Fast food
System: Pizza?
User: No
System: Restaurants?
User: Yes
System: Pizza, Burgers, or Chinese?
User: Burgers This time, although this user has had to trace through at least a portion of the path from a higher-level node 502 of the tree 500, the system has learned yet another meaning for "fast food". It now adds this meaning to the earlier entry in the thesaurus, for example as:

Fast food—Pizza, Burgers

It has now learned two meanings for future use. If a user were now to issue the query "Fast food", the system would respond with the verbal descriptions from the nodes 504, 506 corresponding to both Pizza and Burgers.

Thus, the system can keep learning new meanings of terms based on the intended meanings of users "deduced" from the interactions between users and the system.

Of course, the nature and extent to which the system will incorporate synonyms and/or keywords in a continual learning process will not only depend upon its construction and rules, but also on the quality of the original thesaurus and the quality of the initial inverted index. In addition, where in the tree the system jumps if the user rejects the initial meaning(s) offered by the system can be handled different ways in different implementations.

For example, the system can always jump to fixed ancestor(s) (either the top node or a parent or some ancestor(s) at an intermediate point) or a fixed level (e.g. halfway from the top). This approach has the advantage of being simple to implement, but it has the problem of inflexibility because it may be relatively efficient for certain graphs and associated verbal descriptions, but not for all. For example, if two or more nodes' verbal descriptions are offered and rejected, the relevant node selected would have to be common ancestor(s) of the offered nodes. In other words, with reference to Example 6 which is part of a larger tree, going up to the "Restaurants" node 502 would mean going to the parent of the "Pizza" node 504 rather than all the way to the top in the larger tree containing the portion 500 shown.

A more flexible alternative uses the information recorded in the thesaurus to find every synonym for "pizza" in the thesaurus and collect all the other keywords associated with those synonyms. Then the system would search the inverted index to identify all the nodes associated with these other associated keywords and identify the most common ancestor of all of those nodes and go to it. By using the information in the thesaurus in this way the system makes use of known properties of the one meaning of "fast food", which is "Pizza", to construct an intelligent hypothesis about where the other meanings of "fast food" might lie in the graph. This allows the user to reach another meaning with the least effort and allows the system thereby to learn what the new meaning of "fast food" is more efficiently.

EXAMPLE 7

Of course, just as it may be desirable to create implementations to add meanings to the thesaurus, it may be equally or more desirable to cause an existing meaning for a thesaurus word to be dropped, for example, due to relative lack of use. This process is described with continuing reference to FIG. 5 and the associated inverted index, particularly with respect to the thesaurus entry resulting from the most recent example.

Fast food—Pizza, Burgers

In this example, presume that there have been several uses of the query "fast food" and that the user(s) issuing these queries have almost always selected "Burgers" and almost never "Pizza".

In accordance with another implementation of the invention, the system is constructed to track the frequency of use of a particular term in the thesaurus. Depending upon the particular implementation, the tracking can be done for all entries in the thesaurus, for only those added as part of the "learning" process, or for some specified combination thereof.

In addition, some specified criterion is used to determine when, and which terms, if any, should be removed from the thesaurus. Depending upon the particular implementation the criterion can be based upon usage relative to time, usage of a particular term relative to some other term(s), term usage relative to overall thesaurus usage, or simply elimination of all added terms not used since the last purge.

Thus, presuming that the system has kept track of the frequency of use of different meanings of "fast food", and that "Pizza" does not meet the criterion for a sufficiently high frequency, the meaning "Pizza" can be dropped as a synonym for "Fast food" and the entry (after purging) would look as follows:

Fast food—Burgers

Thus, a further enhanced implementation can be constructed so the system is dynamically updating the thesaurus, either adding meanings or dropping meanings for existing and/or initially unknown words.

EXAMPLE 8

A further advantage to the invention is that, in some implementations, it can be configured so that, when there are multiple relevant nodes to be presented, an associated ranking can be used to determine the type, method or order of presentation. For example, the ranking can be based upon the frequency of use of particular nodes, which is tracked in these implementations, so that the most frequently selected or used nodes are presented first, more prominently, or in a particular manner.

For example, this can be illustrated by continuing from Example 7, where the thesaurus entry was as follows:

Fast food—Pizza, Burgers

Under the assumption that the system has been tracking the frequency of usage of the "Pizza" node and the "Burgers" node and each has been accessed an identical number of times. When a user enters the query "Fast food", as above, the system presents the user with both the "Pizza" node 504 and the "Burgers" node 506, but because it tracks usage and the usage is the same, it presents them in the order they are listed, i.e. "Pizza" and then "Burgers". However, at this point, the user's selection will cause one entry to have a greater frequency of usage relative to the other entry, for example a selection of "Burgers" will make it have a higher frequency of usage and, accordingly, a higher ranking for the next instance of use.

Thus, the next time the system will be presenting both the "Pizza" and "Burgers" nodes to a user, the "Burgers" node 506 will have the higher frequency of usage and, accordingly, will be presented first, or more prominently, or in some other specified manner because of its ranking. If the frequency reverses with use so that the "Pizza" node 504 outranks "Burgers" node 506, then the "Pizza" node 504 will supplant the "Burgers" node 506.

EXAMPLE 9

A further variant of Example 8 allows the node rankings to be used to prune the nodes themselves. In this variant, a criterion can be specified, typically zero usage over a long specified period of time, that is used to remove an entire node. This is advantageously made possible because of the system's ability to "jump" among nodes. Thus, it may occur that a node within the tree is never accessed, but a child node of that node is. In some variants therefore, when this state exists for a sufficiently long period of time, the system is constructed to delete that node. It should be understood that, if handled properly, this process will not even affect the "learning" process because, even if no user action ever directly causes the node to be presented, if the learning process causes the node to be presented the node's access frequency will be non-zero and it will not be "pruned".

In addition, by tracking access frequency on a node basis, a qualitative evaluation of the hierarchical system can be made and visualized. This makes it possible to review the overall hierarchy after some period of time and periodically optimize it based upon the result instead of relying purely upon the dynamic optimization that inherently and naturally flows from use of the teachings of the invention.

Having now described various component aspects of different variants implementing the invention, by way of the above examples, it should be understood that the "jumps" can occur from any node to any node, i.e. vertically and/or laterally and to another node that is higher, lower or on the same "level" as the node from which the jump is made. All manner of vertical and lateral jumps from multiple nodes to multiple nodes are possible.

In addition, it should be understood that in some applications (like document retrieval systems) the verbal description from the identified node may be the one issued whereas, in others (like an IVR system), the verbal descriptions for the children of the identified nodes may be what is presented. Nevertheless, in both cases, the process as described above by way of example will be the same or directly analogous.

Figure 6:
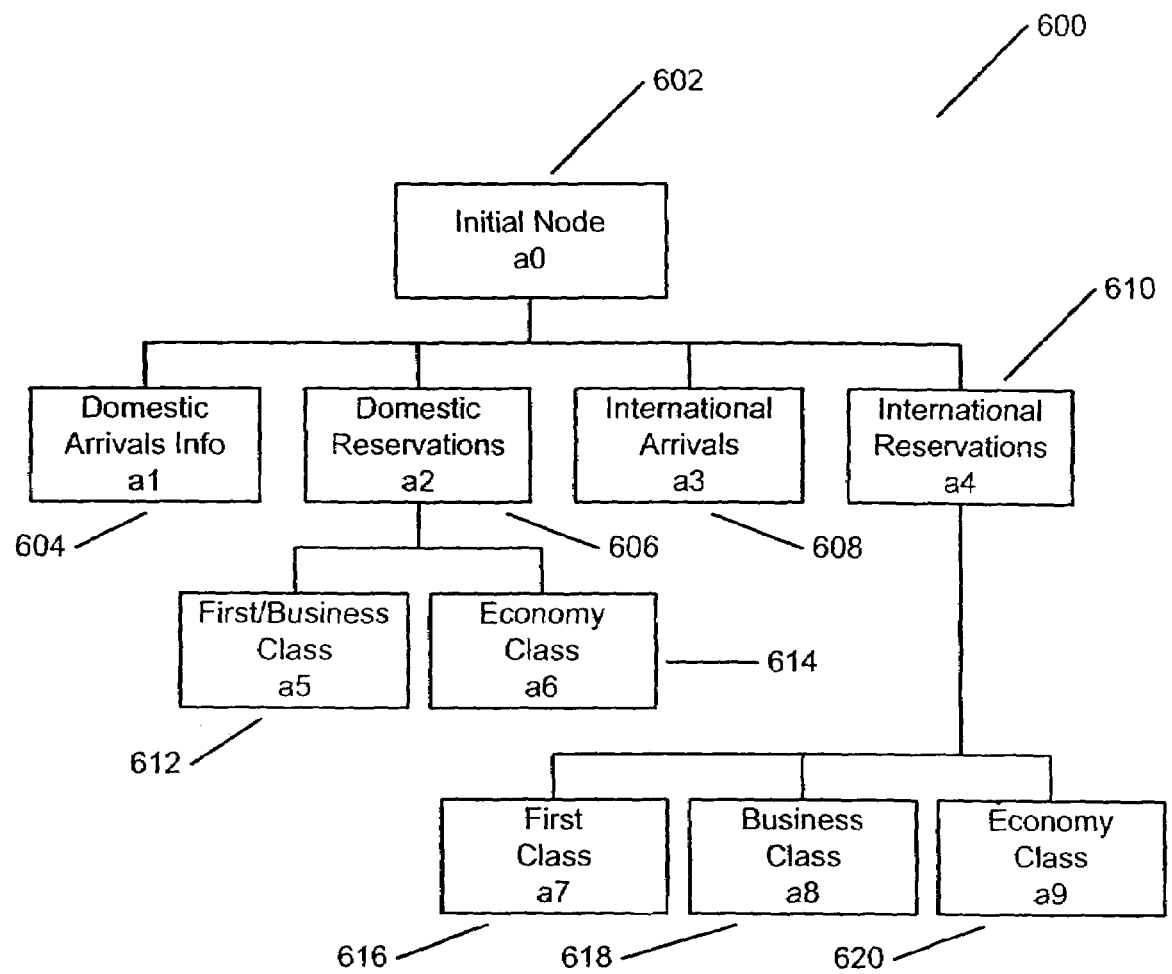
FIG. 6 is an example portion of a graph for a simple automated voice response system used to illustrate a more complex variant of the invention.

Having described the various aspects individually a more commercially suitable example, employing a combination of the above examples, can now be presented with reference to FIG. 6 which illustrates a simplified example of an "interactive voice response unit" (IVR) hierarchy 600 that might be used in the airline industry. Of course, a real menu tree used in an IVR may have any number of nodes from several, up to a thousand, or more. For example, a tree with 4 branches from each node and which has 5 levels uniformly would have 1365 nodes. As shown in FIG. 6, the tree 600 is a hierarchical tree and consists of the following nodes and branches:

Initial start (node a0) 602
domestic flight arrival information (node a1) 604
domestic reservations (node a2) 606
international flight arrival information (node a3) 608
international reservations (node a4) 610

The node 604 identified by a1 is a service node with pre-recorded information. The node 606 has two child node a 2, first/business class (node a5) and economy (node a6). The node 608 identified by a3 is service node with pre-recorded information. The node identified as a4 has three child nodes identified as first class (node a7), business class (node a8), and economy (node a9).

The nodes 612, 614, 616, 618, 620 identified as a5, a6, a7, a8, a9 are all service nodes (i.e. terminal nodes) where a respective customer service representative will interact with the caller.

Of course, a real system may also have a choice at the top level or at each level for a live operator and may even have a choice to go back to the previous menu.

Even for such a simple example, in a traditional interactive voice response system, the caller would have to listen to several choices and then traverse a path down to a service node. Someone interested in business class reservations on a domestic flight would have to traverse the path (a0, a2, a5) for example. This involves listening to multiple choices at each level of the tree (e.g. first a prompt at a0, then four prompts offering a1, a2, a3, and a4 at the next level, at which the caller would choose a2, and finally two prompts offering a5 and a6, at which level the caller would choose a5 and then wait for the operator) and then making a choice by pressing an appropriate number on the telephone dial pad or alternatively saying the appropriate number. In certain cases, he may make a mistake: he may choose international reservations when he is interested in domestic reservations or something similar (simply by pressing the wrong number on his touch-tone telephone or saying the wrong number). If he does, then he has no choice but to disconnect the phone and redial the number (or if the system has a backtracking option, then he can backtrack, but even here he has wasted valuable time).

In contrast, in accordance with a system implementing the invention, the caller would be able to say what he was looking for (e.g. "I want to make a domestic business class reservation") and the system would identify and respond with the appropriate node 612 (e.g. a5 in this case or the relevant customer service representative directly). In other words, it would enable the caller to skip to the correct node(s) without having to trace through the entire path. If the user makes a mistake, he could ask for something different wherever he finds himself in the tree, and skip laterally or vertically to his preferred choice.

The system implementing the invention can further include an option that the entire transaction (e.g. the making of the reservation) would be carried out through natural language interactions with the system without the intervention of a human customer service representative. In other words, all the details of his domestic reservation are obtained by the system and the system updates a database accordingly and issues whatever commands are required (e.g. the mailing of a ticket) to be carried out by some human representative later.

While it is true that some more advanced interactive voice response systems available today allow for natural language interactions, they are highly constrained natural language interactions with relatively little or no intervention by a human operator. However, unlike with systems using the invention, those systems still require direct path traversal through the hierarchy (i.e. jumping to non-connected nodes is not contemplated or possible, let alone allowed). Moreover, such systems still typically use a limited list of keywords, which the caller is required to use to correctly traverse to the next connected node.

In contrast, variants of a system implemented in accordance with the invention can incorporate an automatically generated or updated thesaurus, which greatly expands the range of words or terms a caller can use. In these variants, the user is not restricted to parroting the highly constrained script as required by other interactive voice response systems, nor is the user limited to traversal to a connected node. In these more complex implementations of the invention, a system can be constructed that is able to learn new words or terms that it may not have understood the first time. For example, if a user asks for "coach class" and the system does not have the word "coach" or the phrase "coach class" in its keyword list or in its current thesaurus, then on this first occasion, it offers the user a traditional path down the conventional tree. But it tracks what the user did, what node of the tree the user went to, and on this basis, it learns a new response to "coach class". The next time a caller (either the same person or a different person) uses the words "coach class" the system does not offer the traditional path as it did the first time, but instead it offers a new set of nodes based on what it learned the first time. Thus, in such implementations, the thesaurus is a dynamically changing entity, continually updating itself by learning new words and terms and learning new "meanings" (i.e. new actions or responses) for existing terms.

Implementations according to the invention can also allow novel groupings of nodes to be presented to the caller based on his query. If he asks for "economy class" without specifying whether he wants an international or domestic reservation, then the system would offer him the nodes a6 and a9 (appropriately phrased in natural language), and allow him to further choose whether he wants international or domestic reservations, something current systems do not offer. In other words, the system can pick out the relevant responses from different branches of the tree and pool them together and offer them to the caller.

This functioning of the system, by which it is able to skip around laterally or vertically in the tree, is enabled by the associating of natural language (i.e. human language) verbal descriptions with each node, and then using these as an initial basis for the navigation, augmented, in some variants, by a dynamically changing thesaurus that greatly expands its range and comprehension.

Thus, based upon a conceptual understanding of the above examples, further details of the process will now be presented.

The flowcharts of FIGS. 7 through 14 are illustrative of a functional example of the general method of a more complex variant the invention as would be implemented in software according to the flowcharts in this case for a newspaper subscription application. It should be understood that particular details are provided in the description below merely for completeness or because they are necessary or helpful for forming an understanding of the particular implementation. They are not to be considered essential for implementing the invention. Similarly, details unrelated to or unnecessary for understanding the invention have been omitted to avoid confusion.

An example implementation is described and contains two programs, a preparatory program, illustrated in FIGS. 7-10 and a transaction or query processing program, illustrated in FIGS. 11-14. In addition, a particular software implementation fairly corresponding to the flowcharts of FIGS. 7-14 appears in the Appendix A that follows. The program contained therein, is written in the "C" programming language for execution on any personal computer having a processor, memory, input-output, etc. capabilities to run the particular application in its intended environment.

Broadly, the first program process of FIGS. 7-10 constructs an inverted index and an application-specific thesaurus and the second program process of FIGS. 11-14 uses those constructs in a transaction processing system to interact with a user.

In the preparatory program of FIGS. 7A, 7B and 8-10, the shorthand names of files that the program uses and the contents of the corresponding files are as follows. Notably, both the process parts shown in FIGS. 7A and 7B as well as the process part shown in FIG. 8 are indicated as start points. This is because they are each independent of each other in that any of the three could start before any other or two or more could be run concurrently. Thus, it should not be presumed that they are mutually exclusive or any one is per se required for the invention. Moreover, it should be understood that any one or more could have been undertaken at a different time, by a different entity, or for a different application. Whether one or more of the portions shown in FIG. 7A, FIG. 7B or FIG. 8 are the starting points, the starting point for actual operational processing will be the same.

The file named 'p' contains a list of prompts or verbal descriptions in a hierarchical relationship (i.e. they can be visualized or arranged in a tree-type graph).

The file named 'w' contains documents that are related to the prompts or verbal descriptions in 'p'. For example, 'w' could contain a training manual for customer service personnel or a website document that is likely to contain material that is related to the queries customers may have. This file is used to create a thesaurus.

The file named 'f', contains forms that are used to elicit relevant information from customers. They have fields like 'name', for example, which would be used by the system to ask and record a caller's name.

The file named 'x' contains an index associating the forms in 'f' with terminal prompts or descriptions in 'p'. Once a terminal prompt is reached in the process, the corresponding form from the file 'x' is activated, and the system proceeds to elicit information from the user.

The file named 's' contains a list of application-specific stop words, many of which are high-occurrence and/or generally uninformative words like 'a', 'an', 'the' or 'from' or words with a high-occurrence in for the particular application such that they have little meaning, for example, 'fly' in an airline reservation system, 'street' in a navigation system, 'file' in a computer search tool. These are eliminated from 'p' and 'w' and 'f' before processing, because they don't carry any useful information for the application.

The file 't.cfg' contains the thesaurus and inverted index that will be constructed by the program. Of course, in alternative variants, the thesaurus could be a separate file from the inverted index file and either or both could be made up of multiple files.

The file 'l.cfg' is a file that is used to store newly learned words. As with the 't.cfg' file, the 'l.cfg' file need not be a separate file, it could be part of 't.cfg', or part of a separate thesaurus and/or inverted index file. Similarly, the 'l.cfg' file could be made up of several files.

With reference to FIGS. 7A, 7B and 8 through 10, the processes as carried out by the first program are as follows. It bears noting that, although the process and its components are presented by way of example in a particular order, unless a specific process component is expressly stated to necessarily have to occur at a particular time or after some other particular process component, or two process components must necessarily occur in sequence because one relies upon completion of the other before it can start, no order should be implied or considered required since the order in different implementations may be different and may vary based upon the particular programmer, programming language and/or computer involved.

The files p, w, f, x, and s are each read and processed as follows. It should be understood that the order of processing of file 'p' relative to file 'f' or their respective sub-processing components, although shown sequentially, could be done in a myriad of ways including doing each of the reading extracting and storing concurrently or as a common operation (i.e. reading for both is done before extracting for both, etc.).

Specifically, keywords are extracted from p_ and from f_. These are initially just all the words or terms contained in the prompts in p. The keywords are stored, for example, in a temporary file.

Similarly, thesaurus words are extracted from w. These are initially just all the words or terms in w. They are also stored, for example, in a temporary file.

Stop words are loaded from s (902) and stop words and duplicate words are eliminated from keywords and thesaurus words stored in the temporary files.

Figure 9:
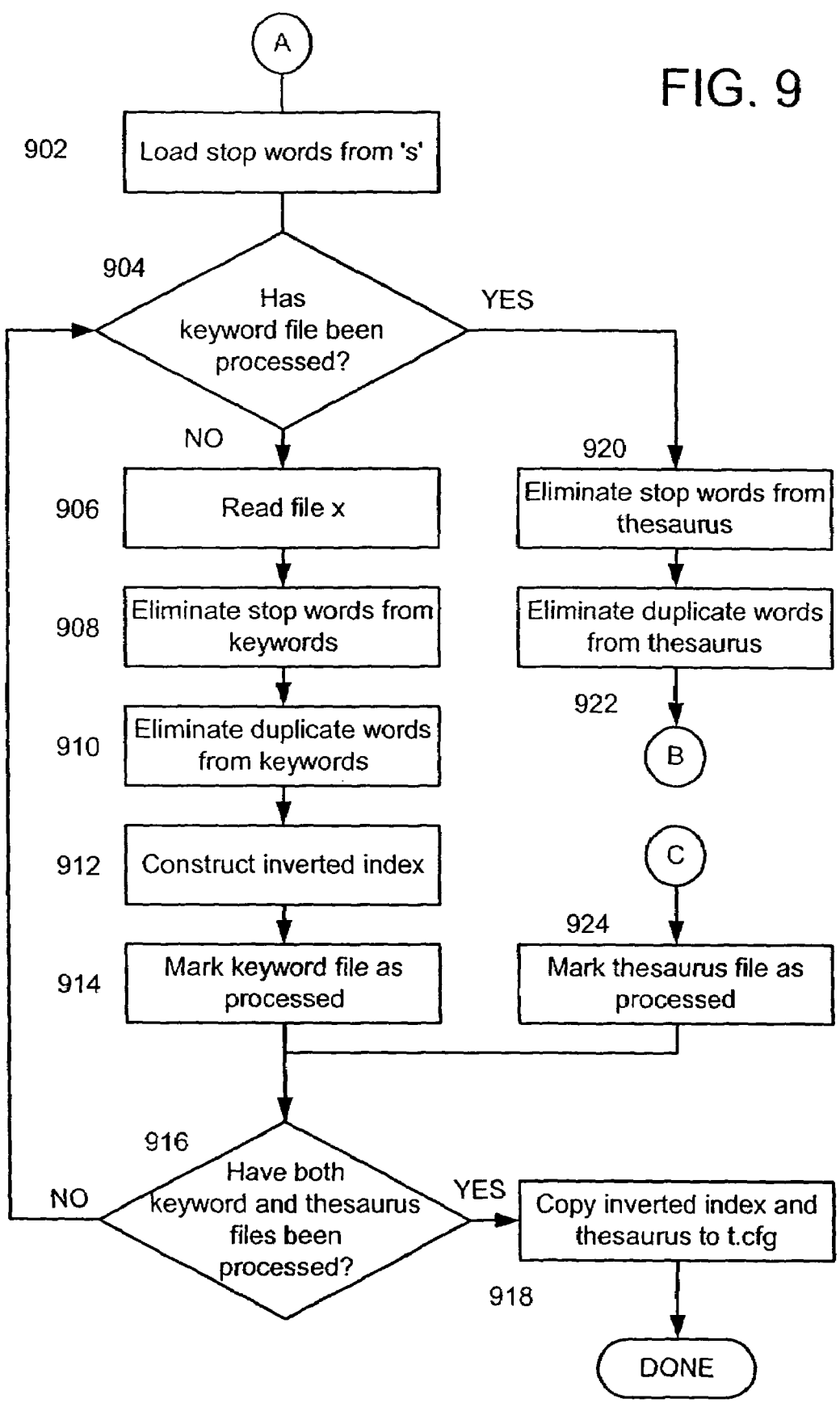
Figure 10:
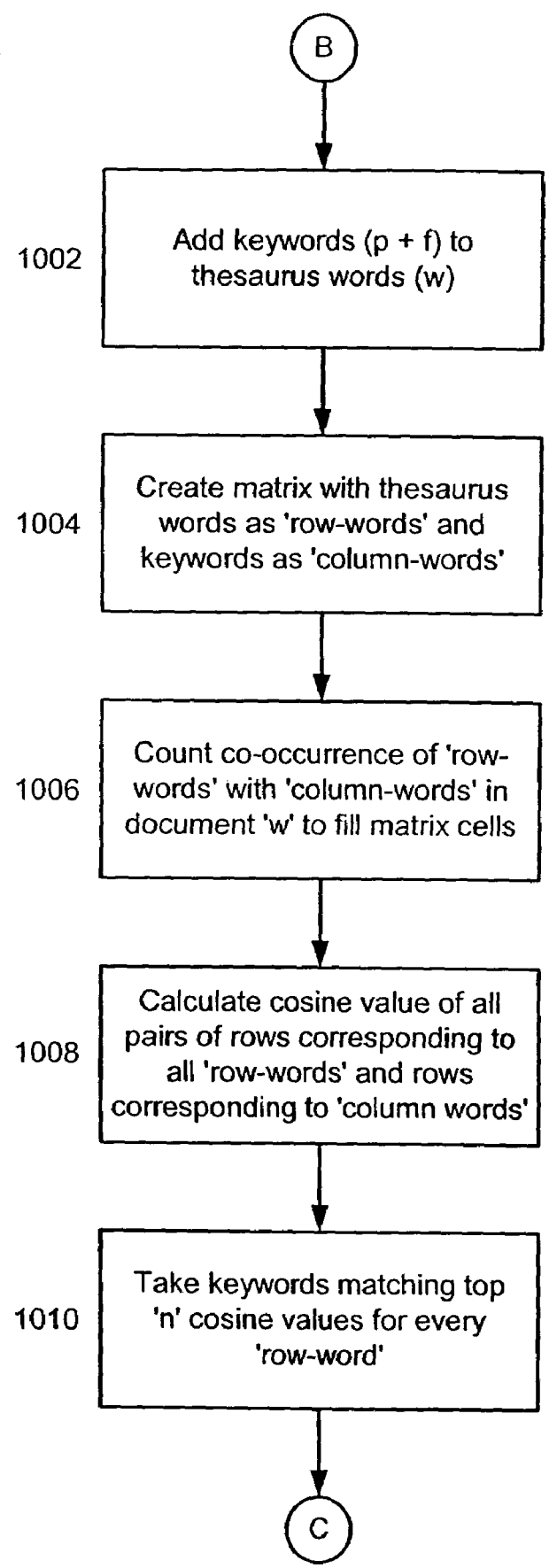

The thesaurus is constructed in accordance with FIGS. 9 and 10 described in overview as follows:

a. Increment the file of thesaurus words with keywords from p and f remaining after elimination of stop words.

b. Create a matrix of thesaurus words as row words (or words listed along the rows of the matrix) against keywords as column words (or words listed along the columns of the matrix).

c. Count the number of co-occurrences of each row word with each column word of the matrix in the documents contained in w and fill in that number in the corresponding matrix cell. (For example, a co-occurrence of a pair of words may be defined as that pair occurring in the same paragraph. If w is made up of a hundred paragraphs, then take each pair of row word and column word and count the number of times this pair occurs within the space of each of the hundred paragraphs in w. For each pair, the pair may co-occur zero or more times in a paragraph and add up the number of co-occurrences in all the paragraphs in w.)

This process yields a matrix filled with nonnegative integers in each cell. It is then possible to consider each row of numbers as a vector associated with the corresponding row word. When viewed geometrically, these vectors, one for each row word, form angles with each other in a multi-dimensional space. As a result, we can calculate the cosine of each such angle by computing scalar products for the angles. Thus, we compute the cosines of the angles formed by the vectors associated with each pair of row words.

The cosine values for all pairs of row words and column words are calculated and stored, for example, in a new matrix.

For each row word, the top 'n' cosine values are identified as are the corresponding keywords. For example, in an airline system context, if there are two row words 'coach' and 'economy', where 'economy' is also a keyword (originally from p and/or f), and if the cosine value of this pair or words is among the top 'n' cosines for the word 'coach', then 'economy' is identified as a synonymous keyword for coach.

A new file can then be created, formatted for example, by listing thesaurus words on the left (e.g. coach), and against each thesaurus word, its associated keywords (e.g. economy). This is referred to as an inverted index (i.e. the thesaurus) of row words and their keyword synonyms. Essentially, this file will now contain words like 'coach' coupled with its particular alternative meanings, one of which may be 'economy'. The user interactive transaction processing program, the second program, will later use this thesaurus file when a caller uses a word like 'coach' in his query to determine the relevant keywords (like 'economy'). This will enable the program to find the relevant prompt with which to respond to the user.

Optionally, to provide the system with a set of prompts or verbal descriptions with which to respond to a user, another inverted index is created using the files p, f, and x. This index will contain a list of keywords from p and/or f associated with the prompts in which they occur. Thus, when a user uses a synonym like 'coach' in a query, the second program will look up the thesaurus, find the keywords corresponding to it (e.g. 'economy'), and then look up the inverted index to find the prompts corresponding to 'economy' and other corresponding keywords.

Once both the inverted index and thesaurus files have been created, the file t.cfg can be created from them for use by the second program.

One example of the program flow for a fairly generic transaction processing program implementing one variant of the invention is illustrated in the flowcharts of FIGS. 11 through 14. This example is configured to incorporate a collection of several of previously described simple aspects. To demonstrate the functions of this program and how this program operates, for context we use an example interaction that a calling customer might have with this example system.

Following the example is the Appendix contains that program code essentially implementing a variant of the invention largely corresponding to that of FIGS. 7 through 14.

The particular example we use for purposes of illustration is for an automated telephone system for a newspaper, like the New York Times. For simplicity, every item in the flowchart is not traced through since, an understanding of the process with respect to one path will be sufficient to allow an understanding of the other paths.

The example begins with "I want to subscribe" uttered by the caller to the system. We will assume that the first three words of the query (i.e. "I", "want", and "to") are stop words and the last word (i.e. "subscribe") is neither a keyword nor a thesaurus word.

The process as carried out by the second program are as follows:

The files t.cfg, l.cfg, f, x, and s are read (1102).

The keywords, thesaurus words, prompts from t.cfg. are loaded (1104), as are the learned words from l.cfg. Initially, l.cfg will be empty as the program has not yet learned any new words. The forms and index of forms against prompts from f and x respectively are loaded, as are stop words from s.

The program opens the interaction with a greeting (1106) and an elicitation of the first query from the caller (1108). This might be: "Thank you for calling the New Herald. How may we help you?"

The caller then utters his or her statement: "I want to subscribe".

The stop words in the statement are first eliminated, leaving behind just the word "subscribe".

The statement is then processed in the following way:

The keywords and the thesaurus words remaining in the query are identified (1202, 1204) by comparing with the list in t.cfg and l.cfg. As we have assumed that "subscribe" is neither, we have none.

The prompts that best match the identified keywords and thesaurus words are selected (1206). As there are no such words identified, there are no prompts selected.

The program arrives at a decision in the flowchart: are any nodes selected? (1208). Since the answer is in the negative, the program will follow the branch and select the top level node (1218). (Note: These top level prompts are the ones at the top level of the menu tree.) This completes the prompt selection process. The process then proceeds to the second part of the query process.

The process proceeds with another decision: has a single leaf prompt been selected? (1210). Since the top level prompts are selected (of which there are more than one and also none is a leaf prompt), a negative answer is the result.

These prompts or verbal descriptions are issued to the user (caller) and elicit another response. Assume that the offered verbal descriptions are as follows:
System: Are you calling about subscriptions?
System: Is there a problem with your paper or delivery?
System: Would you like information about the New York Times website?
System: Are you calling about advertisements?
System: Are you calling about something else?
Assume further that the caller responds as follows:
User: I am calling about subscriptions.

As a result, the program returns to selecting verbal descriptions by identifying the keywords and the thesaurus words remaining in the query by comparing with the list in t.cfg and l.cfg (1202, 1204). "Subscriptions" is now synonymous with a keyword and it is identified.

The program will again select verbal description(s) that best match the identified keywords and thesaurus words (1206).

For example, assume these are:
System: Would you like to order a subscription?
System: Would you like to give a gift subscription?
System: Would you like to change your address or change any other information?

The program then arrives at a decision branch (1208) in the flowchart: are any nodes selected? Since the answer is affirmative, it follows that branch and exits the prompt selection process and returns to the query process.

This begins with another decision box: is a single leaf node selected? (1210). The answer is no, since three prompts have been selected.

Next, these verbal descriptions are issued to the caller and the system will await his response (1220). We assume the caller responds as follows:
User: I want to order a subscription The program will again return through a loop to the prompt selection process (1202, 1204, 1206) where the program will identify the keywords and the thesaurus words remaining in the query by comparing with the list in t.cfg and l.cfg. "Order" and "subscription" are now identified.

Verbal descriptions are selected that best match the identified keywords and thesaurus words. Now assume this is just the prompt "Would you like to order a subscription?" from the three descriptions above.

The program will then arrive at a decision branch (1208) in the flowchart: are any nodes selected? Since the answer is affirmative, it follows that branch and exits the prompt selection process and returns to the query process to again arrive at a decision: has a single leaf node been selected? (1210). This time the answer is yes, a single prompt has been reached, which is also a leaf prompt, since it is at the bottom of the menu tree.

This is followed by another decision: any verbal description corresponding to the node? (1212). The program checks t.cfg and finds the answer is no.

The branch then leads to yet another decision (1214): is a form for verbal description available? The answer by checking the index x is the yes branch. This leads to the portion of the flowchart of FIG. 13.

The form is processed in the following way:

The first part is a decision: is it a response form? (1302). The answer is no.

The system then issues questions to the caller based on the form and accepts information back (1304). The questions are of the form "Please tell us your name", "Where do you live?", "Do you want an annual or half-yearly subscription?" etc. The caller provides the information to the system.

It repeats the information the caller has given the system and asks if the information is correct. Let us assume the user confirms that the information is correct.

The system then calls an external routine to store the information in a database. The routine returns another form to the system (1306) and returns in a loop to the question: is it a response form? (1302). Since the form contains questions about the payment, based on the type and period of subscription selected by the caller, the answer will be negative.

The system then issues these questions to the caller and the caller provides the required information (1304).

The system then repeats the information and gets a confirmation from the caller.

The information is passed to another routine (mentioned in the form) to update the database. This routine (1306) then returns a response form and again returns in the loop to the question: is it a response form? (1302). This time the answer is yes. The system then issues a response (1308) thanking the caller for the subscription, and exits this process returning to FIG. 11.

The system now exits the query process as well since the caller's query has been completely processed and the corresponding actions taken by the system. It now returns to the main part of the program.

The next process in the main part of the program is a question: is there an unknown word in the caller's query? (1112). The answer is yes, since the word "subscribe" in the initial query was not known to the system. This invokes the portion of the flowchart of FIG. 14.

The system therefore has to learn this previously unknown word:

The learning process begins with a decision: is the word already in l.cfg? (1402). The answer is no, since l.cfg is initially empty and the word has not been encountered before.

The corresponding "NO" branch is followed and the word is added to the list of learned words (initially empty) with keywords from the final single leaf prompt that was selected (1404).

Figure 11:
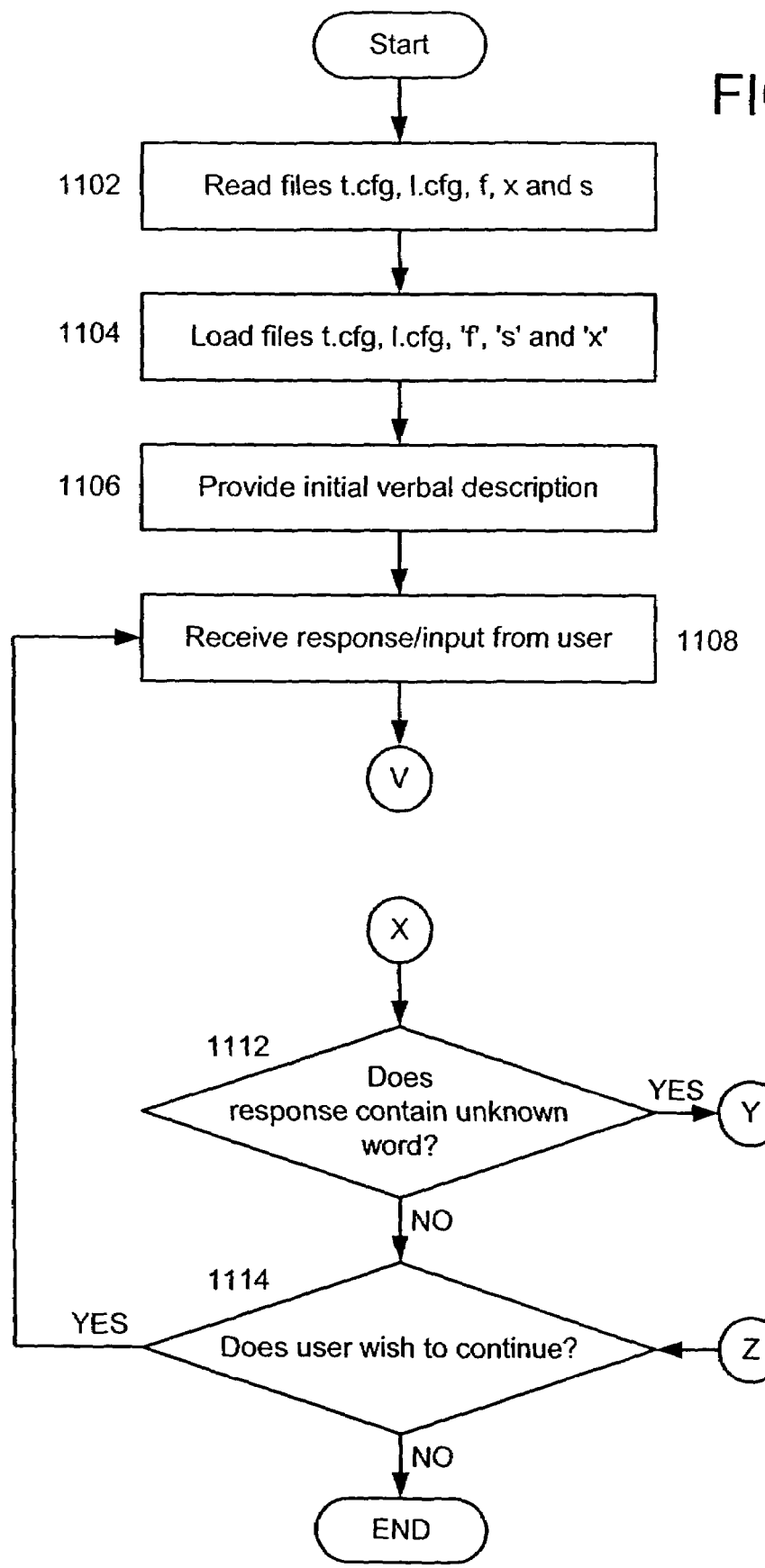
FIGS. 11-14 are collectively an overall flowchart illustrating an example process in accordance with a further variant of the present invention.
Figure 12:
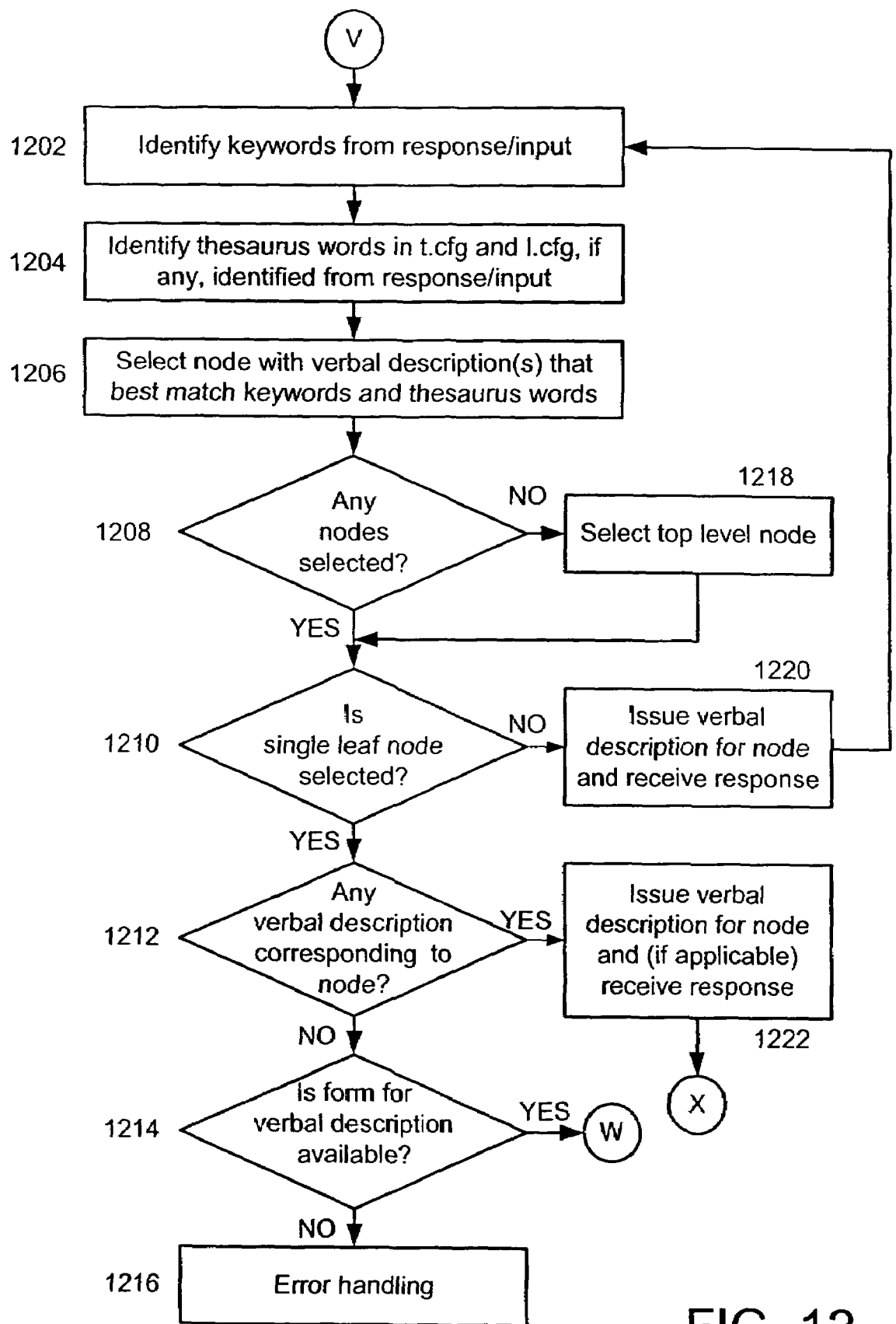
Figure 13:
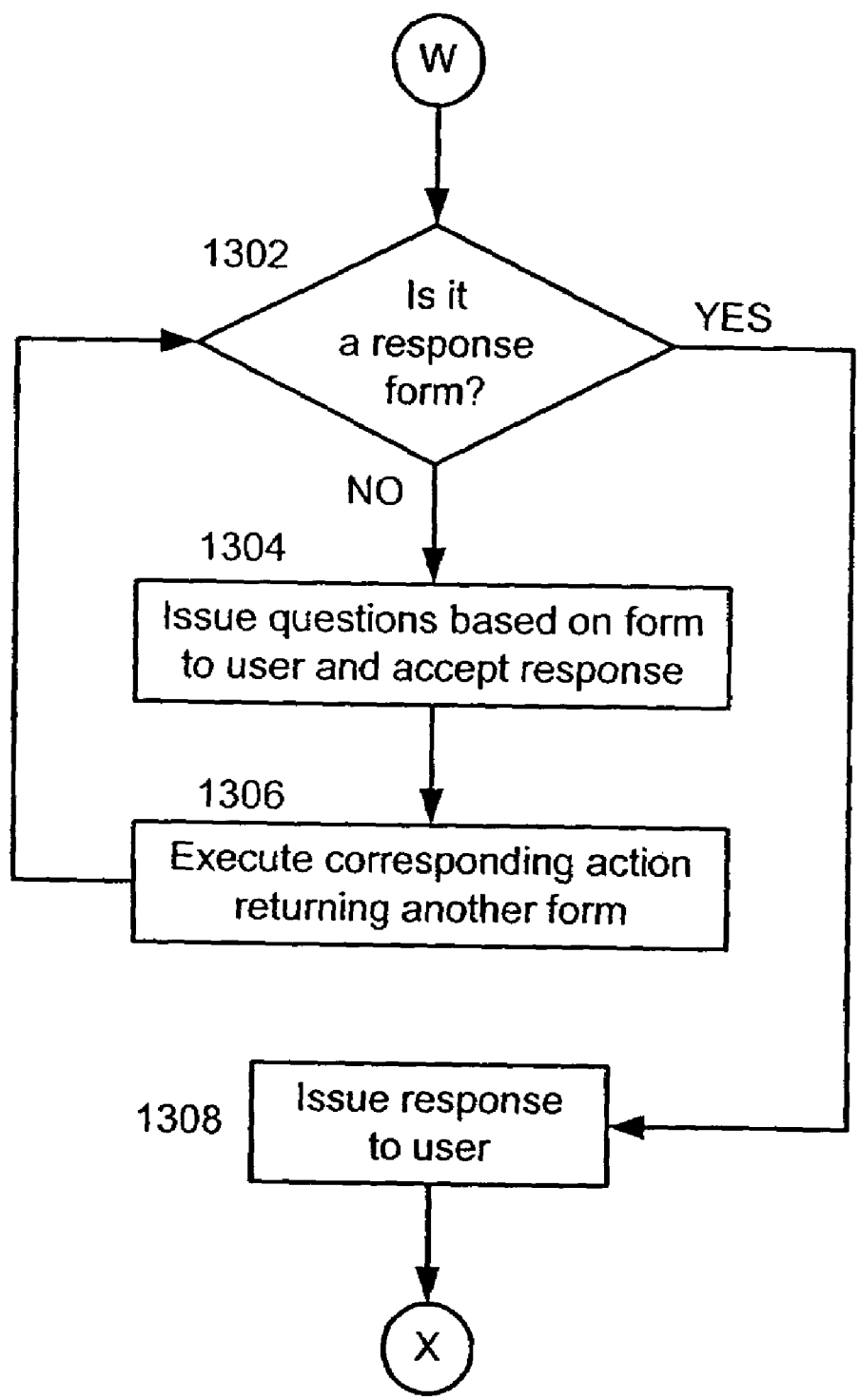
Figure 14:
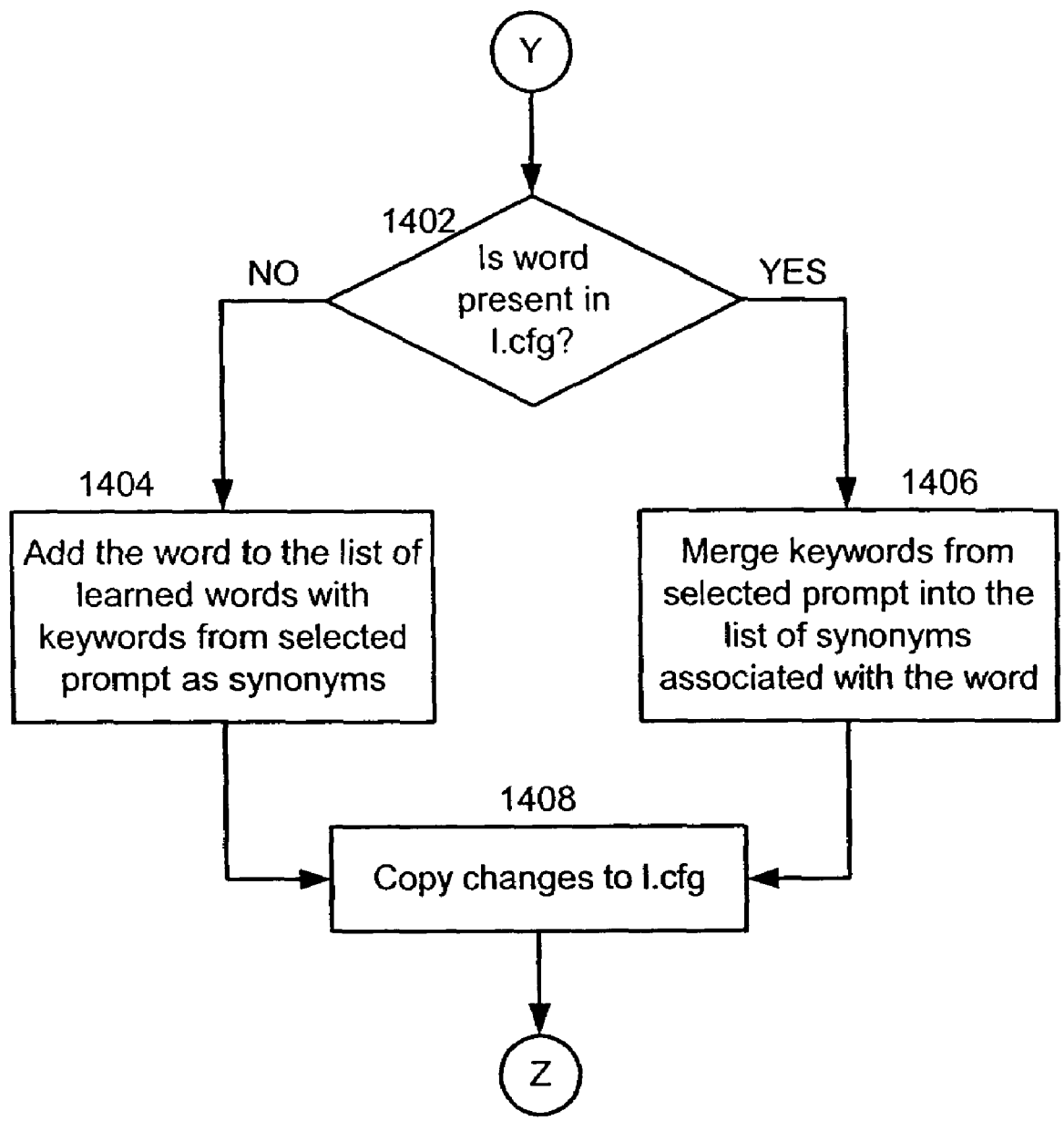

The system then records these changes in l.cfg (1408) and returns to the main part of the program in FIG. 11. It has now learned the meaning of the initially unknown word "subscribe".

Next, the program asks the caller if he wishes to continue (1114) (i.e. are there any further queries). We assume the answer is no and the system thanks the user and exits.

Now, having described the example traversal of one path through the second program with reference to the flowchart, an example dialogue for the path traversal that has taken place is presented so the complete transaction can now be understood.

Dialogue:
Caller: I want to subscribe
System: Are you calling about subscriptions?
System: Is there a problem with your paper or delivery?
System: Would you like information about the New York Times website?
System: Are you calling about advertisements?
System: Are you calling about something else?
Caller: I am calling about subscriptions
System: Would you like to order a subscription?
System: Would you like to give a gift subscription?
System: Would you like to change your address or change any other information?
Caller: I want to order a subscription
System: Please tell us your name
Caller: Bertrand Russell
System: Where do you live?

The dialogue continues in this way with the system eliciting the required information from the caller.

Having demonstrated traversal in a system where the system was constructed to learn when an unknown word is used, what happens the second time a caller uses the same word "subscribe" in a query after it has been learned by the system can now be demonstrated. This demonstrates the power of including the optional feature of learning in the program.

In this case, the dialogue that occurs when a new caller uses the word "subscribe" following the above is now presented.

Dialogue:
Caller: I want to subscribe
System: Please tell us your name
Caller: J. L. Austin
System: Where do you live?

Thereafter, the process continues. Notably, the system has now learned the correct response to the query "I want to subscribe".

Other Variants

Having described several simple and more complex examples that make it possible to use the invention, other variants can now be presented. Examples of such optional functions that can be incorporated into other variants, individually or collectively, include:

a) creating the thesaurus by providing access to a collection of multiple documents and determining synonymy based on sufficient similarity of meaning with the keywords as measured by the frequency of co-occurrence of the keywords in the collection of documents;

b) identifying words in the user's response by recording the response for future learning;

c) parsing out of a response all non-stop word unknown terms or keywords;

d) identifying synonyms for all non-stop terms in the user's response;

e) cycling between user and system responses until the user reaches a vertex (i.e. verbal description) that enables him to carry out his goal and updating the thesaurus when the goal vertex is reached by associating the recorded previously unknown words in the user's response with the keywords that are associated with the verbal description reached by the user;

f) recording, when the goal vertex is reached, the pairs of synonyms in the user's responses and the keywords that are associated with the verbal description reached by the user;

g) removing associations between keywords and their synonyms from the thesaurus that have not been accessed more than a specified amount of times within a specified period (this can be based upon a parameter set in the system by the system's administrator or can occur as part of program maintenance or updates);

h) selecting the verbal descriptions that best meet the user's goal as indicated by the keywords and synonyms in the user's response by identifying the keywords in the user's response and/or the keywords corresponding to synonyms in the user's response and computing a degree of match between each verbal description and the identified keywords, in accordance with conventional linguistic processing techniques;

i) computing the degree of match between verbal descriptions and identified keywords by utilizing the pairs of synonyms in user's response and the keywords associated with the verbal descriptions reached by users as previously recorded;

j) responding to the user on the basis of verbal descriptions selected by presenting the user with verbal descriptions that best match the user's previous response;

k) for "best match" variants, in the event that even the best matches have a low degree of match, the best "n" verbal descriptions are presented to the user ("n" being a number representing a predetermined system parameter);

l) for "best match" variants, in the event that the best matches have a low degree of match, the user is automatically connected to a human operator, when or if a human operator is available;

m) for "best match" variants in the event that the best matches have a low degree of match, the best "n" verbal descriptions are presented to the user, along with an option of being connected to a human operator when or if a human operator is available;

n) presenting the user with those verbal descriptions that best match the user's previous response in order to elicit any information from the user that may be required to accomplish the user's goal;

o) recording information elicited from a user in a database for future use;

p) selecting multiple verticies in the graph structure that are not connected to a previously selected vertex, based upon parameters associated with nodes correlated to keywords and synonyms in a user's response;

q) selecting a vertex in the graph structure in the same row as the previously selected vertex based upon the keywords and synonyms in the user's response; and/or r) updating the thesaurus by adding words from a user's response that are not in the thesaurus.

Finally, it is to be understood that various variants of the invention including representative embodiments have been presented to assist in understanding the invention. It should be understood that they are not to be considered limitations on the invention as defined by the claims, or limitations on equivalents to the claims. For instance, some of these variants are mutually contradictory, in that they cannot be simultaneously present in a single embodiment. Similarly, some advantages are applicable to one aspect of the invention, and inapplicable to others. Thus, no particular features or advantages should be considered dispositive in determining equivalence.

It should therefore be understood that the above description is only representative of illustrative embodiments. For the convenience of the reader, the above description has focused on a representative sample of all possible embodiments, a sample that teaches the principles of the invention. The description has not attempted to exhaustively enumerate all possible combinations or variations, for example, those arising out of the use of particular hardware or software, or the vast number of different types of applications in which the invention can be used. That alternate embodiments may not have been presented for a specific portion of the invention, or that further undescribed alternate embodiments may be available for a portion of the invention, is not to be considered a disclaimer of those alternate embodiments. One of ordinary skill will appreciate that many of those undescribed embodiments incorporate the minimum essential aspects of the invention and others incorporate one or more equivalent aspects.

APPENDIX

File Identification

Main Source Files
    main.c, process.c, arraylib.c, stemlib.c, dialog.c, interactive.c, formlib.c, Header Files
    globalvar.h, process.h, arraylib.h, forms.h Make Files
    Makefile Parameter Files
    t.ini, d.ini Data Files
    p, w, s, f, x, a Configuration Files
    t.cfg, l.cfg Shell Script Files
    acct_info, add_acct, chg_acct, get_pymt, updt_pymt, sus-p_deli, updt_acct, prefer

We claim:

1. A method performed by a program executed by a processor to navigate among an arranged group of nodes, each of the nodes having an associated verbal description, the method comprising:

eliminating stop words and duplicates from the verbal descriptions to create a list of keywords;

creating a list of thesaurus words;

creating a first matrix comprising a correlation of at least some thesaurus words with at least some keywords;

creating a second matrix by calculating cosine values from a co-occurrence analysis of the entries in the first matrix;

determining a synonymy among the at least some thesaurus words and the at least some keywords; and creating a thesaurus configured as an inverted index based upon the synonomy.

2. The method of claim 1 further comprising:

tracking frequency of use of the nodes.

3. The method of claim 2 further comprising:

ranking the nodes based upon a result of the tracking.

4. The method of claim 1 further comprising:

pruning a node from the group of nodes based upon a frequency of usage criterion.

5. The method of claim 1 further comprising:

adding a synonym entry into the thesaurus based upon a result of an unknown word analysis.

6. The method of claim 1 wherein the thesaurus further comprises at least some learned entries, the method further comprising:

deleting a learned entry based upon satisfaction of a frequency of use criterion.

* * * * *